(12) United States Patent
Corrodi et al.

(10) Patent No.: US 12,304,395 B2
(45) Date of Patent: May 20, 2025

(54) CAMERA MONITORING SYSTEM DISPLAY INCLUDING PARALLAX MANIPULATION

(71) Applicant: STONERIDGE, INC., Novi, MI (US)

(72) Inventors: Brad Corrodi, Princeton, NJ (US); Troy Otis Cooprider, White Lake, MI (US)

(73) Assignee: Stoneridge, Inc., Novi, MI (US)

( * ) Notice: Subject to any disclaimer, the term of this patent is extended or adjusted under 35 U.S.C. 154(b) by 11 days.

(21) Appl. No.: 18/566,187

(22) PCT Filed: May 27, 2022

(86) PCT No.: PCT/US2022/031329
§ 371 (c)(1),
(2) Date: Dec. 1, 2023

(87) PCT Pub. No.: WO2022/256255
PCT Pub. Date: Dec. 8, 2022

(65) Prior Publication Data
US 2024/0253568 A1 Aug. 1, 2024

Related U.S. Application Data

(60) Provisional application No. 63/195,207, filed on Jun. 1, 2021.

(51) Int. Cl.
*B60R 1/28* (2022.01)
*B60R 11/02* (2006.01)

(52) U.S. Cl.
CPC ............ *B60R 1/28* (2022.01); *B60R 11/0229* (2013.01); *B60R 2300/10* (2013.01);
(Continued)

(58) Field of Classification Search
CPC .... B60R 1/20; B60R 1/22; B60R 1/25; B60R 1/26; B60R 1/28; B60R 11/0229;
(Continued)

(56) References Cited

U.S. PATENT DOCUMENTS 9,102,269 B2 8/2015 Waite et al.
9,104,920 B2 8/2015 Yoon et al.
(Continued)

FOREIGN PATENT DOCUMENTS

DE 102018100194 1/2019
DE 102015202846 6/2020
(Continued)

OTHER PUBLICATIONS

International Preliminary Report on Patentability for International Patent Application No. PCT/US2022/031329 dated Dec. 14, 2023.
(Continued)

*Primary Examiner* — Nathnael Aynalem
(74) *Attorney, Agent, or Firm* — Carlson, Gaskey & Olds, P.C.

(57) ABSTRACT

A mirror replacement system for a commercial vehicle includes a camera monitoring system (CMS). The CMS comprises a camera (20a, 20b) and a display (18a, 18b) configured to display the image of the at least one camera to a vehicle operator. A driver monitoring system (DMS) includes at least one interior camera (22a, 22b) having a field of view including at least a portion of the vehicle operators head. The DMS is configured to identify at least one of a head position and orientation of the vehicle operator, a pose of the vehicle operator, and a gaze direction of the vehicle operator. A controller is configured to modify at least one of a relative position of objects in an image, a relative size of the objects in the image, and a relative skew of the objects in the image in response to identifying a rotation of the operator's viewpoint relative to the at least one display.

20 Claims, 5 Drawing Sheets

(52) U.S. Cl.
CPC ..... *B60R 2300/306* (2013.01); *B60R 2300/50* (2013.01); *B60R 2300/8046* (2013.01)

(58) Field of Classification Search
CPC ......... B60R 1/04; B60R 1/06; B60R 11/0235; B60R 2300/101; B60R 2300/105; B60R 2300/10; B60R 2300/50; B60R 2300/8046; B60R 2300/306; B60R 1/00; B60R 2300/70; B60R 2300/80; B60R 2300/802; B60R 11/04; B60R 2001/1215; B60R 2011/0276; B60R 2300/205; B60K 2370/176; B60K 2370/1868; B60K 2370/21; B60K 2370/52; B60K 2370/797; B60K 35/00; B60K 35/81; B60K 35/285; B60K 2370/152; B60K 2370/1526; B60K 2370/1529; B60K 2370/1531; B60K 2370/1533; B60K 2370/736; B60K 2370/739; B60K 2370/149; B60K 2370/194; H04N 7/181; H04N 13/383; H04N 13/366; H04N 13/376; H04N 13/373; H04N 13/371; G02B 27/01; G02B 27/0093; G05B 2219/35503; G06F 3/012; G06F 3/013
USPC ........................................................ 348/148
See application file for complete search history.

(56) References Cited

U.S. PATENT DOCUMENTS

| | | | |
|---|---|---|---|
| 9,738,224 B2 | 8/2017 | Gieseke et al. | |
| 10,112,539 B2 * | 10/2018 | Kameshima | B60K 35/81 |
| 10,324,297 B2 | 6/2019 | Kunze | |
| 10,542,244 B2 | 1/2020 | Pflug | |
| 2015/0009010 A1 | 1/2015 | Biemer | |
| 2015/0294169 A1 | 10/2015 | Zhou et al. | |
| 2018/0027230 A1 * | 1/2018 | Kerr | G06F 1/163 345/156 |
| 2021/0380046 A1 * | 12/2021 | Nagata | H04N 21/44008 |
| 2022/0001803 A1 * | 1/2022 | Nagata | B60R 1/007 |
| 2022/0041107 A1 * | 2/2022 | Nagata | H04N 7/181 |

FOREIGN PATENT DOCUMENTS

| | | |
|---|---|---|
| KR | 101413231 | 6/2014 |
| WO | 2004077175 | 9/2004 |
| WO | 2014204794 | 12/2014 |

OTHER PUBLICATIONS

International Search Report and Written Opinion for International Patent Application No. PCT/US2022/031329 dated Sep. 5, 2022.

* cited by examiner

CAMERA MONITORING SYSTEM DISPLAY INCLUDING PARALLAX MANIPULATION

CROSS-REFERENCE TO RELATED APPLICATION

This application claims priority to U.S. Provisional Patent Application 63/195,207 filed on Jun. 1, 2021.

TECHNICAL FIELD

This disclosure relates to a camera monitoring system (CMS) for use in a commercial vehicle, and more specifically to a CMS including at least one image display including a parallax simulating image manipulation.

BACKGROUND

Mirror replacement systems, and camera systems for supplementing mirror views, are utilized in commercial vehicles to enhance the ability of a vehicle operator to see a surrounding environment. Camera monitoring systems (CMS) utilize one or more cameras to provide an enhanced field of view to a vehicle operator. In some examples, the camera monitoring systems cover a larger field of view than a conventional mirror, or include views that are not fully obtainable via a conventional mirror.

Existing CMS utilize a set of displays that replicate the views provided by one or more conventional mirrors as well as any additional views. The views provided by the CMS are flat two-dimensional views. Due to the nature of camera imaging, the flat two-dimensional views do not shift or adjust based on the position of the vehicle operator's head or the direction of the operator's gaze as a conventional mirror would.

SUMMARY OF THE INVENTION

In one exemplary embodiment a mirror replacement system for a commercial vehicle includes a camera monitoring system (CMS) including at least one camera, and at least one display configured to display the image of the at least one camera to a vehicle operator, a driver monitoring system (DMS) including at least one interior cameras, the at least one interior camera having a field of view including at least a portion of the vehicle operators head, the fields of view partially overlapping, the DMS being configured to identify at least one of a head position and orientation of the vehicle operator, a pose of the vehicle operator, and a gaze direction of the vehicle operator, and a controller configured to modify at least one of a relative position of objects in an image shown by the at least one display, a relative size of the objects in the image, and a relative skew of the objects in the image in response to identifying a rotation of the operator's viewpoint relative to the at least one display.

In another example of the above described mirror replacement system for a commercial vehicle the at least one display includes a first display disposed at or near a first A-pillar and a second display disposed at or near a second A-pillar, each of the first display and the second display configured to display a corresponding rear view of the vehicle.

In another example of any of the above described mirror replacement systems for a commercial vehicle the corresponding rear view of the vehicle includes at least one of a Class II and a Class IV view.

In another example of any of the above described mirror replacement systems for a commercial vehicle the controller is configured to modify at least one of the relative positions, the relative skew, and the relative size of the objects in each display in response to identifying the rotation of the operator's viewpoint relative to the at least one display.

In another example of any of the above described mirror replacement systems for a commercial vehicle the controller is configured to modify each of the relative position of objects in the image, the relative size of objects in the image, and the relative skew of objects in the image in response to the change in the rotation of the operator's viewpoint relative to the at least one display.

In another example of any of the above described mirror replacement systems for a commercial vehicle the controller further includes an object identification module configured to distinguish objects within an image feed.

In another example of any of the above described mirror replacement systems for a commercial vehicle the at least one interior camera includes at least two interior cameras.

An exemplary method for operating a camera monitoring system includes detecting a shift in at least one of a vehicle operator's head position, the vehicle operator's pose and the vehicle operator's gaze, determining a rotation of the vehicle operator relative to a display based on the detected shift, and digitally manipulating at least one camera monitoring system (CMS) image by simulating at least one parallax effect corresponding to the determined rotation.

In another example of the above described method for operating a camera monitoring system digitally manipulating the at least one camera monitoring system image comprises adjusting at least one of a relative size of objects within the CMS image, a relative position of the objects within the CMS image, and a relative skew of the objects within the CMS image.

In another example of any of the above described methods for operating a camera monitoring system digitally manipulating the at least one CMS image comprises adjusting each of the relative size of objects within the CMS image, the relative position of the objects within the CMS image, and a relative skew of the objects within the CMS image.

In another example of any of the above described methods for operating a camera monitoring system digitally manipulating by adjusting at least one of a relative size of objects within the CMS image, a relative position of the objects within the CMS image, and a relative skew of the objects within the CMS image includes adjusting the image relative to an anchor point.

In another example of any of the above described methods for operating a camera monitoring system the anchor point is at least one object in the image.

In another example of any of the above described methods for operating a camera monitoring system the anchor point is a focal point of the vehicle operator.

In another example of any of the above described methods for operating a camera monitoring system the anchor point is position midway between at least two identified objects.

In another example of any of the above described methods for operating a camera monitoring system detecting the rotation of the operator's viewpoint relative to the at least one display includes monitoring each of the vehicle operator's head position, pose, and gaze position using a driver monitoring system.

In another example of any of the above described methods for operating a camera monitoring system the CMS image is a 2D image.

In another example of any of the above described methods for operating a camera monitoring system the CMS image is a 3D image.

In another example of any of the above described methods for operating a camera monitoring system the method is continuously iterated and the at least one CMS image includes a video feed.

In another example of any of the above described methods for operating a camera monitoring system the video feed includes a first camera corresponding to a first mirror position and a second camera corresponding to a second mirror position.

In another example of any of the above described methods for operating a camera monitoring system simulating at least one parallax effect comprises magnifying an actual parallax effect and simulating the magnified parallax effect.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
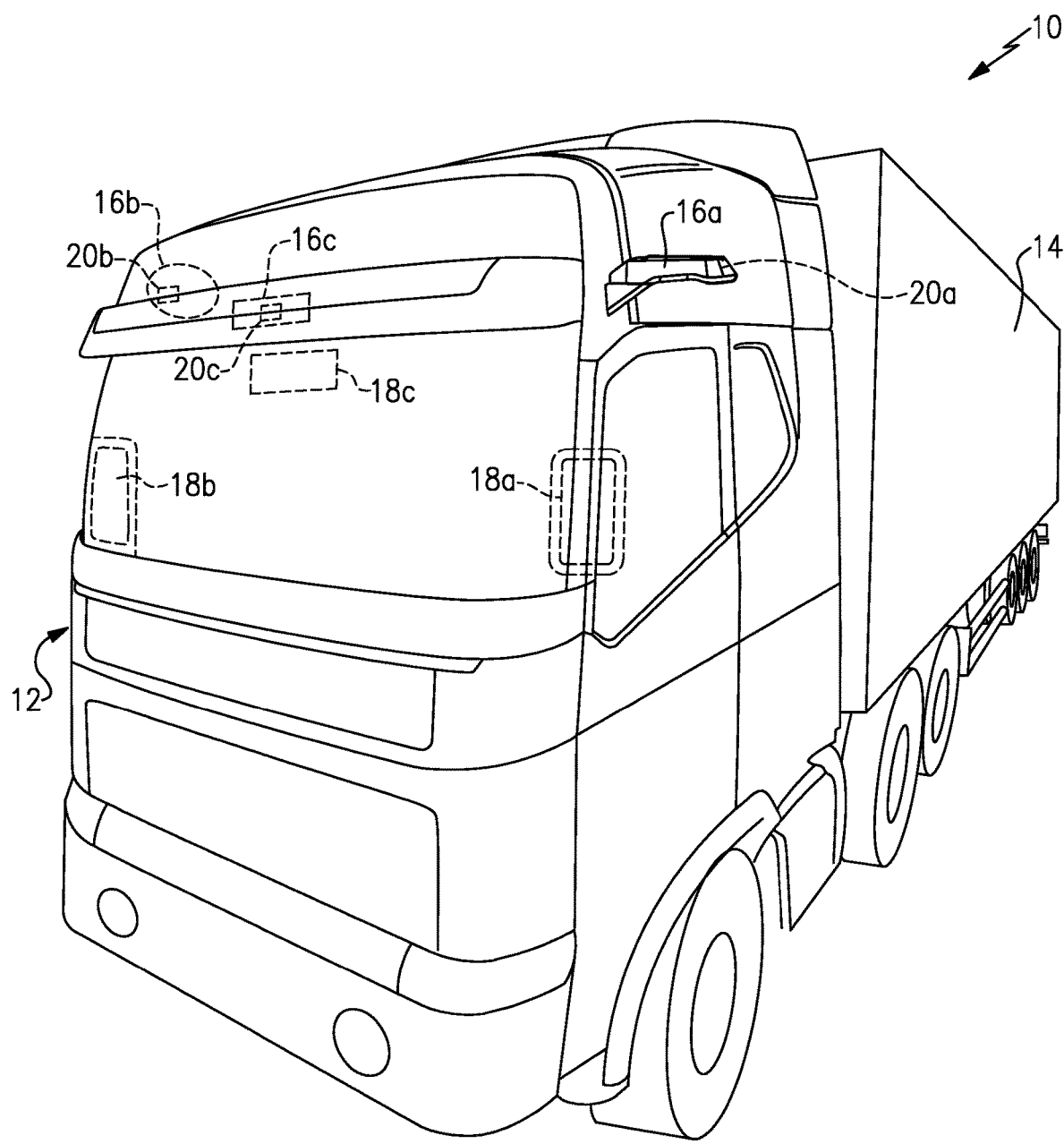
FIG. 1A is a schematic front view of a commercial truck with a camera monitoring system (CMS) used to provide at least Class II and Class IV views.
Figure 1B:
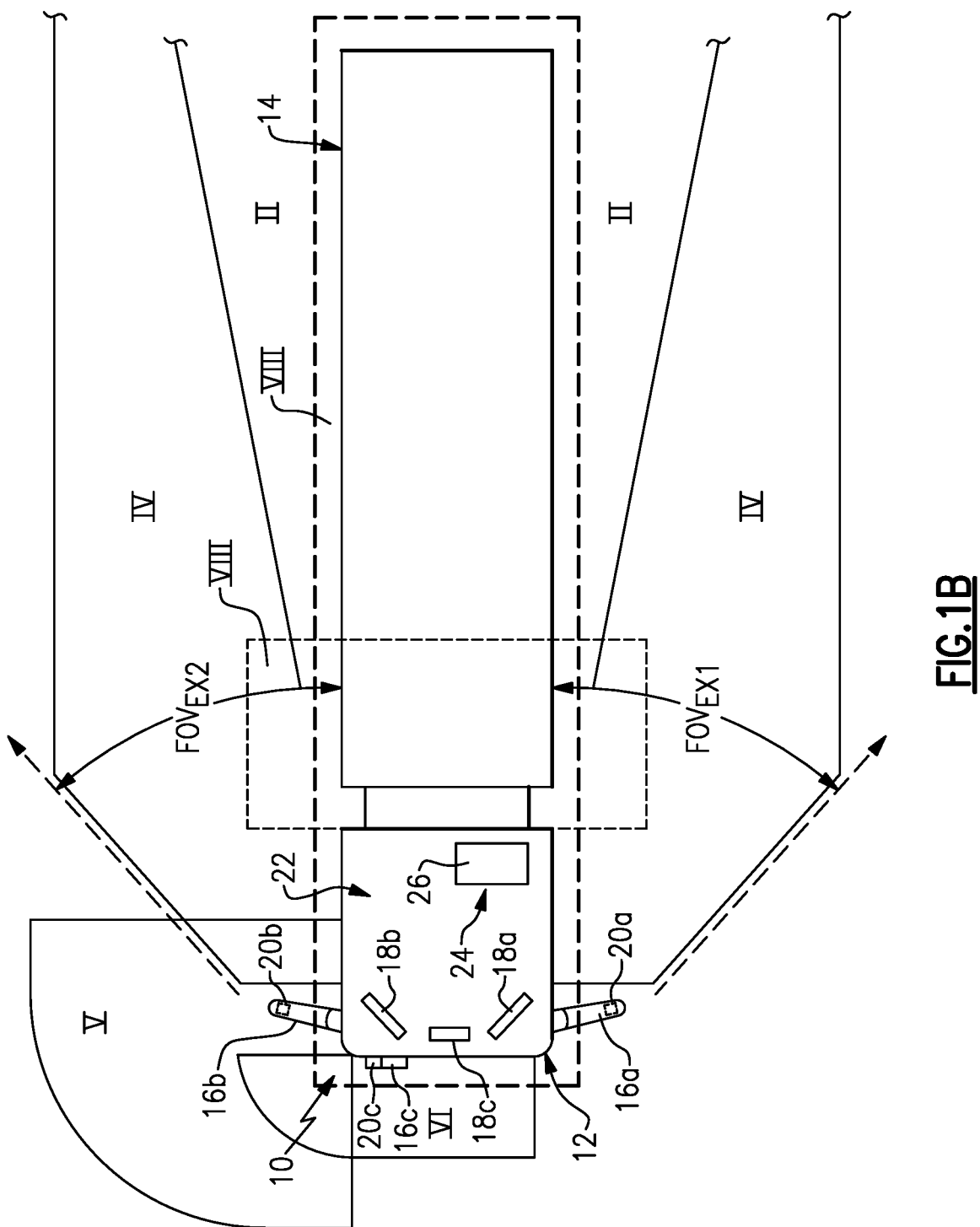
FIG. 1B is a schematic top elevational view of a commercial truck with a camera monitoring system providing Class II, Class IV, Class V and Class VI views.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied to other types of vehicles. The vehicle 10 incorporates a camera monitoring system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on the respective sides of the vehicle 10. The views provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

Figure 2:
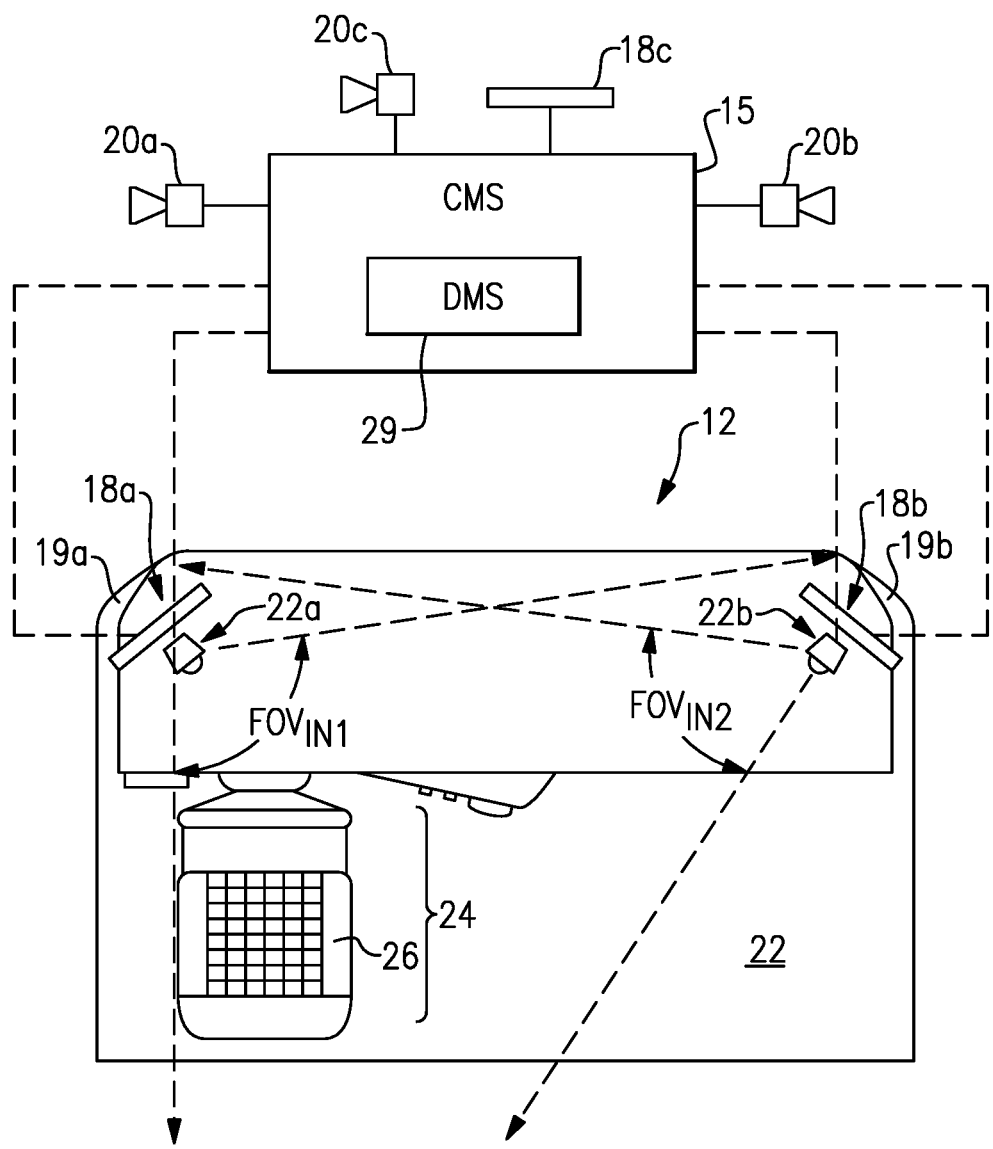
FIG. 2 is a schematic top perspective view of a vehicle cabin including displays and interior cameras.

If class VIII views are desired, camera housings can be disposed at the sides and rear of the vehicle 10 to provide fields of view including some or all of the class VIII zones around the vehicle 10. In such examples, the third display 18c can include one or more frames displaying the class VIII views. Alternatively, additional displays can be added near the first, second and third displays 18a, 18b, 18c and provide a display dedicated to providing a class VIII view. In yet another alternative the additional displays can be included in alternative locations throughout the vehicle 10 cabin allowing the user a good view The displays 18a, 18b, 18c face a driver region 24 within the cabin 22 where an operator is seated on a driver seat 26. It may be desirable to incorporate a driver monitoring system (DMS) 29 into the CMS 15 to evaluate driver activity in the driver region 24 and to identify driver parameters that may be indicative of distracted driving or of any other driver characteristic being monitored. One example DMS 29 is illustrated in FIG. 2. First and second interior cameras 28a, 28b are arranged in the vehicle cabin 22 near the first and second displays 18a, 18b and are configured to capture driver images within the vehicle cabin 22. The first and second interior cameras 28a, 28b respectively provide first and second interior fields of view FOVIN1, FOVIN2 that at least partially overlap one another in the driver region 24. The first display 18a is positioned such that it is in the second interior field of view FOVIN2, and the second display 18b is positioned such that it is in the first interior field of view FOVIN1. Driver activity is determined in at least some examples by monitoring the gaze and/or pose of the driver by using operating the vehicle while using the first and second interior cameras 28a, 28b.

Due to the nature of two-dimensional video imaging, video feed(s) generated by a static camera do not replicate a parallax effect that occurs on physical mirrors. The parallax effect is the effect where the position, size or orientation of an object appears to be different (relative to surrounding objects) when viewed from different positions or angles. By way of example changing an angle that you look at an object can make the object look closer to, or farther away from, another object within your field of view. The shifting relative positions, sizes, and orientations of objects due to the parallax effect aids humans in depth perception and can provide valuable information. In the case of a vehicle operator, the added depth perception of the parallax effect can assist a driver in planning maneuvers to avoid an object and/or prioritizing which object to attempt to avoid when multiple objects are presented. Conventional mirrors, and other reflective surfaces, maintain the parallax effect when used to view objects. Movements that cause the parallax affect to make relative positions of objects to change are referred to as rotations.

The CMS 15 included in the vehicle 10 is interconnected with the DMS 29 as described above. A CMS controller within the CMS 15 receives head position, gaze orientation, and/or pose information from the DMS 29 and digitally manipulates the objects in the image corresponding to adjustments in the driver's head position, gaze direction or pose in order to simulate the parallax effect of an actual mirror view. This simulation can be either through adjusting a true 3D image to account for parallax shifts or a partial simulation of parallax shifts using 2D image manipulation, referred to as quasi-3D. The two types of imaging are referred to together as "at least quasi-3D" herein.

With continued reference to FIGS. 1a, 1b and 2, FIG. 3A illustrates an exemplary display screen including a view at least two identified objects, a tree 102 and a sign 104 displayed in a flat 2D image 100. The image 100 provides a view of a real scene 101, illustrated in FIG. 3B. The actual physical location of the objects 102, 104 within the scene 101 does not change when a vehicle operators position causes a rotation. Alternative examples can include any number of additional objects within the image and operate similarly. The objects 102, 104 can be identified via an object identification system within the CMS 15 including a neural network analysis of the received image feeds, a rule-based analysis using predetermined image analysis rules, manual identification by the vehicle operator, and the like. The distance between each object 102, 104 and the vehicle 10, and each object 102, 104 and each other object 102, 104 is determined by the CMS 15, and a "Center" image 110 is generated at the corresponding display 18a or 18b. The center image 110 is the image as it would appear to an operator looking directly at the display and does not include any parallax manipulation. This image is reflective of the left scene 101 in FIG. 3B. In the center image 110, the objects 102, 104 are separated by a distance 106. Alternatively, the object identification can occur at a remote controller, a general vehicle controller, or any other processing system configured to identify objects within the image.

Figure 3A:
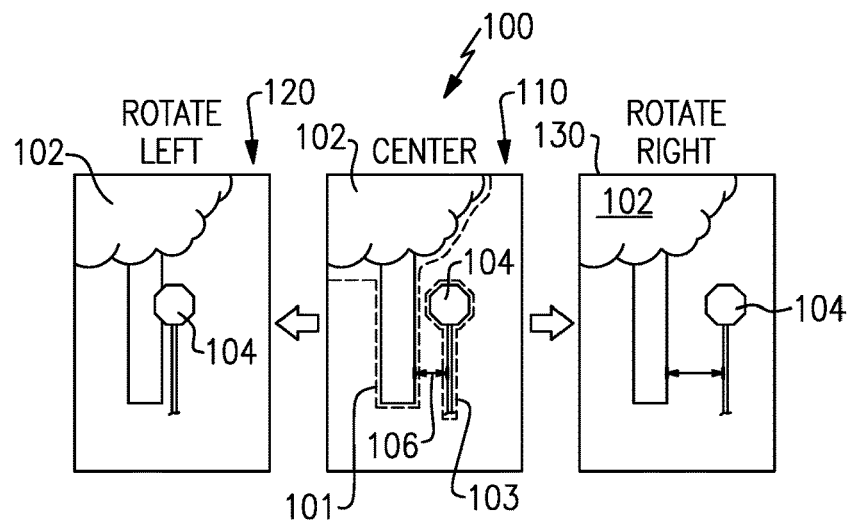
FIG. 3A schematically illustrates a quasi-3D simulated parallax effect on a viewscreen achieved by manipulating a distance between objects in an image.
Figure 3B:
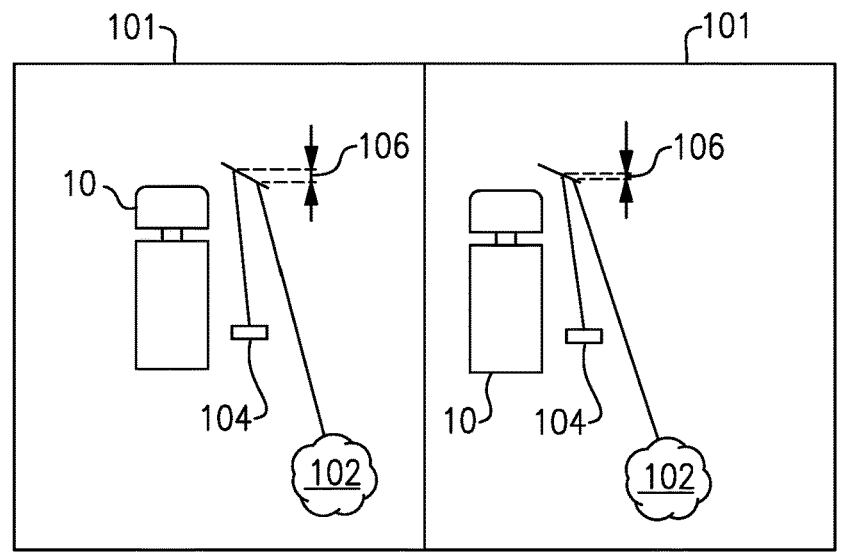
FIG. 3B schematically illustrates a physical scene resulting in the simulated parallax effect of FIG. 3A.

When the vehicle operator shifts their gaze, pose, and/or head position to the left, this shift causes a rotation of the of the operator's view relative to the display screen. The DMS 29 monitors the shift and the relative motion of the driver's viewpoint relative to the display screen, resulting from the rotation, is provided to a parallax control within the CMS 15. The parallax control determines a relative position change between the two or more items corresponding to the parallax shift resulting from the change of perspective. In the example of FIGS. 3A and 3B, the driver's rotation causes the two objects 102, 104 to appear closer together or farther apart, depending on the rotation. Rotation about other axis can cause corresponding position shifts The CMS 15 digitally manipulates the display to move the identified objects 102, 104 to match the relative position change. In the simplified examples of FIG. 3, the parallax control determines that the viewpoint rotating left (view 120) will shift the sign 104 closer to the tree within the plane of the image 100, resulting in an overlap with the sign 104 being in front of the tree. Once this is determined the CMS 15 responds to the identification of a driver's position rotating left, by manipulating the image 120 to reduce the distance 106. This process is performed in real time, allowing the operator to continuously rely on the presented images to provide accurate information.

Conversely, when the operator rotates their viewpoint to the right, the DMS 29 identifies the rotation and informs the CMS 15. The CMS 15 then identifies that the sign 104 and the tree 102 should appear farther apart, and digitally manipulates the image 130 to move the sign 104 farther away from the tree 102.

This operation simulates a parallax effect from shifting perspectives and provides additional depth perception, without generating a truly 3D image. In the described example, one of the objects (the tree 102) is used as an anchor point, and all other objects (the sign 104) are moved relative to the anchor point. The anchor point is a position within the image that is maintained "constant". In alternative examples, the anchor point can be identified in the image, and objects can be moved relative to that anchor point. In yet another example, the shift between two objects 102, 104 can be identified, and both objects 102, 104 can be shifted away from each other along the identified dimension. The anchor point in the image of this example is the simulated "focal point", or point in the image that the operator is looking at.

In addition to shifting the identified objects, the at least quasi-3D parallax effect is achieved in some examples by altering the relative sizes of the objects based on the head position and gaze direction of the driver. With continued reference to FIGS. 1a, 1b, 2 and 3, FIG. 4 schematically illustrates the parallax effect of altering the relative sizes of objects 102, 104 in the image 200. For ease of explanation, the same scene is illustrated in the image 200 of FIG. 4 as was used in the scene of image 100 in FIG. 3. As with the relative positions example, the DMS 29 rotation of the vehicle operator's viewpoint about the display and alters the relative sizes of the objects 102, 104 to correspond to the detected rotation.

Figure 4:
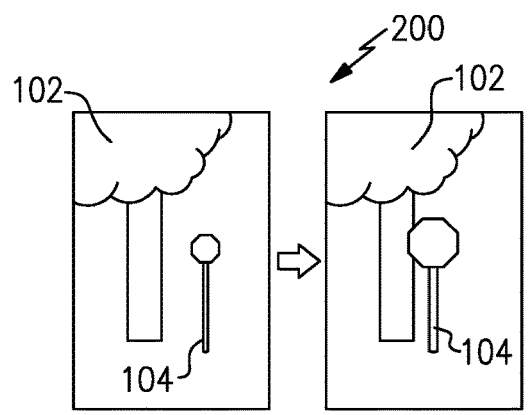
FIG. 4 schematically illustrates another quasi-3D simulated parallax effect achieved by enlarging objects in a foreground.

With reference to both FIGS. 3 and 4, a CMS 15 can further create or enhance the quasi-3D parallax effect by skewing objects 102, 104, with the relative position of the objects 102, 104 determining the magnitude of skew. In addition, the CMS 15 can combine the identified quasi-3D parallax effects described herein to further improve the simulated 3D nature. Further, identical process can be applied to a 3D display, allowing for a similar magnitude of parallax simulation and improving the realism and depth of the 3D display.

In one exemplary implementation, the simulated parallax effect is exaggerated within the display in order to assist a driver in more accurately determining the relative positions of objects within the actual scene. The exaggeration can be achieved in one example, by determining that the operator's rotation has exceeded a predefined magnitude (e.g., greater than 15 degrees of rotation) and begin exaggerating the simulated parallax effect by applying a multiplier to the additional rotation beyond 15 degrees. In another example, a smaller magnification is applied constantly to the determined rotation.

With continued reference to FIGS. 1-4, FIG. 5 illustrates a method for implementing the at least quasi-3D parallax shifting within a vehicle 10. Initially the CMS 15 identifies each object within the image in an "Identify Objects within Image" step 310. The objects can be identified as described above, with regards to FIG. 3. Further, in some examples, the CMS 15 can define a "bounding box" (illustrated as bounding boxes 101 and 103) around the identified object and the bounding box defines what is and is not shifted. Alternatively, the object can be re-identified during each operation, depending on the available computational power of the CMS 15.

Once each object within the image is identified, the CMS 15 determines the relative position of the objects in a "Determine Relative Object Position" step 320. In some examples, a position of each object is determined relative to a single fixed point. The single fixed point can be the identified anchor point within the image, the vehicle 10, or a static object within the image. In some examples, the single fixed point is the anchor point in the image, while in other examples the single fixed point is used only for determining the relative positioning of the objects and the anchor point is dependent on the image.

Once the relative positions of each identified object are determined, the CMS 15 uses the relative positions of the objects, and the position of the camera(s) capturing the image to determines how the objects will shift, resize, or skew relative to each other in response to the driver rotating their point of view relative to the display in an "Identify Parallax Shift Between Objects" step 330. The parallax shift is determined via comparing sequential images based on a known camera movement, utilizing expected or learned parallax shifts, based on known relative positioning relationships, based on expected positioning, or based on a combination of the two.

Figure 5:
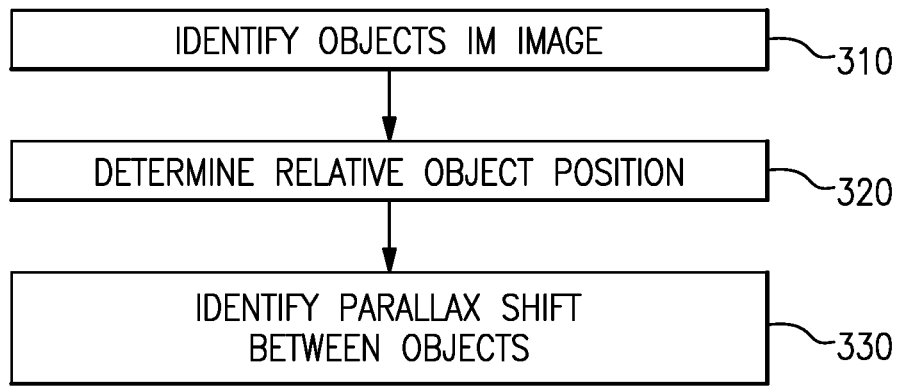
FIG. 5 illustrates a method for identifying expected parallax shifting between objects.
Figure 6:
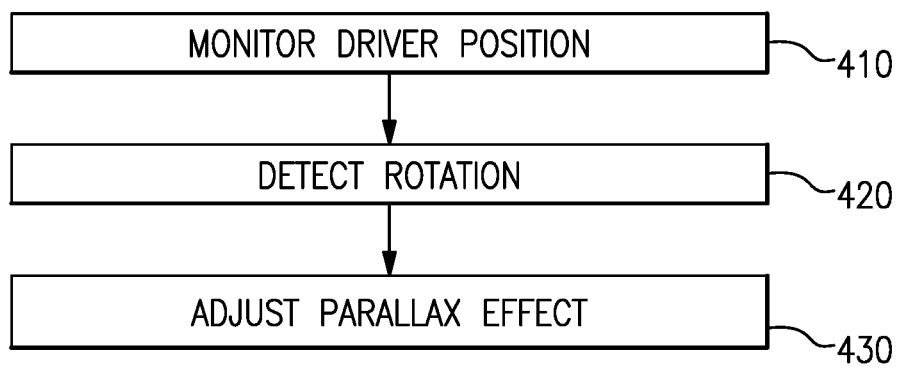
FIG. 6 illustrates a method for creating a simulating parallax effect in an at least partially 3D image.

Concurrently with the method 300 of FIG. 5, the CMS 15 performs a method 400 that determines how to modify the two or three dimensional image to simulate, or partially simulate, the parallax shift and create an at least partially 3D effect. Initially the CMS 15 uses the DMS 29 to monitor the position and orientation of the drivers head, the pose of the driver and/or the direction of the driver's gaze in a "Monitor Driver Position" step 410.

The DMS 29 detects a rotation of the vehicle operator about the display in a "Detect Rotation" step 420, and provides a signal to the CMS 15 identifying the change in the monitored characteristic. The identified change includes at least a direction and magnitude of the change. In some examples the head position, operator pose, and the gaze direction are simultaneously monitored, and the detection is a detection of the combined change.

Once the identified detection is provided to the CMS 15, the CMS 15 responds by shifting the relative position, size, and skew of objects within the image in an "Adjust Parallax Effect" step 430. This process is constantly reiterated during vehicle operation, with the constant adjustments to the parallax effect providing at least quasi-3D by adapting the image to include the shifting parallax effects.

It is appreciated that while example views and figures are included, the examples are simplified and exaggerated for explanatory purposes. In a practical implementation the magnitude of object shifting, resizing, or skewing could be much smaller dependent on which type(s) of quasi-3D parallax effects are being implemented in the given CMS.

Although an example embodiment has been disclosed, a worker of ordinary skill in this art would recognize that certain modifications would come within the scope of the claims. For that reason, the following claims should be studied to determine their true scope and content.

What is claimed is:

1. A mirror replacement system for a commercial vehicle comprising:
a camera monitoring system (CMS) including at least one camera, and at least one display configured to display images from the at least one camera to a vehicle operator;
a driver monitoring system (DMS) including at least one interior camera, the at least one interior camera having a field of view including at least a portion of the vehicle operator's head, the DMS being configured to identify at least one of a head position and orientation of the vehicle operator, a pose of the vehicle operator, and a gaze direction of the vehicle operator; and
a controller configured to:
detect a shift in at least one of the vehicle operator's head position, the vehicle operator's pose and the vehicle operator's gaze;
determine a rotation of the vehicle operator relative to a display based on the detected shift; and
digitally manipulate at least one image from the CMS by simulating at least one parallax effect corresponding to the determined rotation;
wherein the digital manipulation includes an adjustment of a relative position of objects within the at least one image relative to an anchor point; and
wherein the anchor point is at least one object in the at least one image, is a focal point of the vehicle operator, or is a position midway between at least two identified objects in the at least one image.

2. The mirror replacement system of claim 1, wherein the digital manipulation includes an adjustment of a relative size of the objects within the at least one image.

3. The mirror replacement system of claim 1, wherein the digital manipulation includes an adjustment of a relative skew of the objects within the at least one image.

4. The mirror replacement system of claim 1, wherein the at least one display includes a first display disposed at or near a first A-pillar and a second display disposed at or near a second A-pillar, each of the first display and the second display configured to display a corresponding rear view of the vehicle.

5. The mirror replacement system of claim 1, wherein the digital manipulation includes an adjustment of each of the relative position of objects in the at least one image and the relative skew of objects in the at least one image.

6. The mirror replacement system of claim 1, wherein the controller further includes an object identification module configured to distinguish objects within an image feed.

7. The mirror replacement system of claim 1, wherein the anchor point is at least one object in the at least one image.

8. The mirror replacement system of claim 1, wherein the anchor point is a focal point of the vehicle operator.

9. The mirror replacement system of claim 1, wherein the anchor point is a position midway between at least two identified objects in the at least one image.

10. A method for operating a camera monitoring system comprising:
detecting a shift in at least one of a vehicle operator's head position, the vehicle operator's pose and the vehicle operator's gaze;
determining a rotation of the vehicle operator relative to a display based on the detected shift; and
digitally manipulating at least one camera monitoring system (CMS) image by simulating at least one parallax effect corresponding to the determined rotation;

wherein said digitally manipulating the at least one CMS image comprises adjusting a relative position of objects within the at least one CMS image relative to an anchor point;
wherein the anchor point is at least one object in the image, is a focal point of the vehicle operator, or is a position midway between at least two identified objects in the image.

11. The method of claim 10, wherein said digitally manipulating the at least one CMS image includes adjusting a relative size of the objects within the at least one CMS image.

12. The method of claim 10, wherein said digitally manipulating the at least one CMS image includes adjusting a relative skew of the objects within the at least one CMS image.

13. The method of claim 10, wherein digitally manipulating the at least one CMS image comprises adjusting each of the relative size of the objects within the at least one CMS image and the relative skew of the objects within the at least one CMS image.

14. The method of claim 10, wherein the anchor point is at least one object in the at least one CMS image.

15. The method of claim 10, wherein the anchor point is a focal point of the vehicle operator.

16. The method of claim 10, wherein the anchor point is a position midway between at least two identified objects in the at least one CMS image.

17. The method of claim 10, wherein detecting the rotation of the vehicle operator's viewpoint relative to the at least one display includes monitoring each of the vehicle operator's head position, pose, and gaze position using a driver monitoring system.

18. The method of claim 10, wherein the method is continuously iterated and the at least one CMS image includes a video feed.

19. The method of claim 18, wherein the video feed includes a first camera corresponding to a first mirror position and a second camera corresponding to a second mirror position.

20. The method of claim 10, wherein simulating at least one parallax effect comprises magnifying an actual parallax effect and simulating the magnified actual parallax effect.

\* \* \* \* \*